Dec. 29, 1970  J. G. MYERS ETAL  3,551,093
ALKALIZED ALUMINA ABSORBENT AND METHOD OF MAKING SAME
Filed Oct. 21, 1968

INVENTORS
JOHN G. MYERS
JOSEPH H. FIELD
BY Ernest S. Cohen
Robert M. Davidson
ATTORNEYS United States Patent Office 3,551,093
Patented Dec. 29, 1970

3,551,093
ALKALIZED ALUMINA ABSORBENT AND
METHOD OF MAKING SAME
John G. Myers and Joseph H. Field, Pittsburgh, Pa., assignors to the United States of America as represented by the Secretary of the Interior
Filed Oct. 21, 1968, Ser. No. 769,217
Int. Cl. B01j 11/22, 11/82
U.S. Cl. 23—2
23 Claims

ABSTRACT OF THE DISCLOSURE

Improved alkalized alumina absorbents and their methods of manufacture are disclosed. The alternative methods involve (a) mixing sodium aluminate with either red mud, brown mud, retorted oil shale rock or metal salts such as the sulfates, oxides, carbonates or nitrates of iron, copper or cobalt, (b) mixing sodium aluminate with alumina hydrate preferably with the addition of red mud or brown mud, retorted oil shale or the metal salts recited in (a) above, and (c) mixing alumina hydrate and sodium hydroxide preferably with the addition of red mud or brown mud, retorted oil shale, or said metal salts. Absorbents may be prepared by modification of existing processes designed to produce alumina from bauxite. The resulting absorbents possess excellent capacity and lifetime in sulfur oxide absorption.

This invention resulted from work done by the Bureau of Mines of the Department of the Interior, and the domestic title to the invention is in the Government.

BACKGROUND OF THE INVENTION

Field of invention

This invention relates to improved alkalized alumina absorbent for use in gas purification. Further, this invention relates to the method of making said absorbents and also the method of using said absorbents to remove sulfur oxides more particularly, inorganic, acidic sulfur oxides from industrial gases.

At present, the largest portion of sulfur oxide emissions results from the combustion of certain types of coal and oil which contain appreciable amounts of sulfur. Other sources of sulfur oxide contamination include water, gas, smelting gases, petroleum or tar distillation gases and sulfuric acid plant effluents.

The release into the atmosphere of gases containing sulfur oxides presents a serious air pollution and public health problem. Currently, tens of millions of tons of sulfur oxides are vented into the atmosphere over populated regions each year. The damage caused by such pollution is enormous and there is general agreement among the industrialized nations that these sulfur oxide emissions must be reduced.

One method designed to prevent pollution which has been used in some localities is to limit power plants to the burning of fuels low in sulfur content. The efficacy of this approach is in many instances overcome by the unavailability or high cost of low sulfur fuels. Attempts have also been made to desulfurize fuels prior to combustion. While light fuel oils can be desulfurized by treatment with hydrogen and are often so treated if hydrogen is available from a reforming operation and if the treatment does not deleteriously affect the hydrocarbon structure, heavier fuel oils are rarely desulfurized because their sulfur content is more tenaciously bound and because desulfurization would be too costly. No process to date will economically desulfurize coal.

Consequently, if advantage is to be taken from the availability of sulfur containing fuels and if other sources of sulfur oxide emissions are to be controlled, resort must be made to an efficient and economical method of removing sulfur oxides from flue gases, moreover as sulfur is a valuable natural resource of limited supply, recovery of sulfur is highly desirable.

Description of prior art

Prior art methods of removing sulfur oxides from flue gases have come under the following general categories:

(1) additive processes,
(2) oxidation of sulfur dioxide,
(3) reduction of sulfur oxides to sulfur,
(4) wet absorption processes,
(5) dry adsorption processes, and
(6) dry absorption processes.

In the additive processes, materials having the ability to combine with sulfur trioxide are added to either the fuel or combustion gases. Additives which have been employed include: ammonia, soda, limestone, magnesite and dolomite. These additives have the disadvantages of high cost and inability to undergo regeneration.

Direct oxidation of sulfur dioxide to sulfur trioxide by passage over a vanadium oxide or platinum contact mass is possible. However, the low concentration of sulfur oxides in most flue gases causes the ultimate sulfuric acid product to be dilute. Also, impurities present in the stack gases tend to contaminate the sulfuric acid obtained.

Reduction of sulfur dioxide to sulfur or other sulfur compounds is possible with hydrogen, hydrogen sulfide, carbon monoxide, methane, metallic sulfides, natural gas, and carbon. None of these processes has proven to be an economical means of sulfur oxide removal from stack gases.

Wet washing of waste gases with water to remove sulfur dioxide is not practical because of the low solubility of sulfur dioxide. A large number of additives have been proposed to increase the absorptivity of aqueous solutions or slurries. These additives include, manganese sulfate, calcium bicarbonate, lime, ammonia, and sodium sulfite-bisulfite. The fundamental drawback of all wet processes is that the flue gas must be cooled to a low temperature, below 100° C., for the absorption to take place. Gases treated in this manner usually exit at a very low temperature and are saturated with water vapor. Hence, they have a low buoyancy and a tendency to sink upon emission from a stack rather than rising as desired.

Sulfur dioxide can be adsorbed at low temperature by materials such as aluminum oxide, silica, gel, synthetic zeolites and activated carbon. Since, however, these materials cannot hold sulfur dioxide at elevated temperatures adsorption processes possess the same drawback as wet absorption processes.

Absorption of sulfur oxides at high temperatures has been reported with alkalized alumina and manganese oxide. While these absorbents are able to operate at moderately high temperatures, operational costs have to date prohibited their large scale use.

As a result, there remains in the art a critical need for an efficient and economical method of recovering sulfur oxides from flue gases.

SUMMARY

We have now discovered that improved forms of alkalized alumina may be manufactured simply and directly using, for example, simple modifications of processes designed to recover alumina from bauxite and that these absorbents will function efficiently and economically in the removal of sulfur oxides from the gases.

Accordingly, the objects of this invention are:

to provide improved forms of alkalized alumina absorbents;

to provide modifications in the process of recovering alumina from bauxite which enable the efficient production of improved alkalized alumina absorbents; and to provide a method of removing sulfur oxides from industrial gases using an improved form of alkalized alumina absorbent.

These and other objects and advantages of the invention will be more clearly ascertained from a consideration of the following description of the drawings and preferred embodiments.

DESCRIPTION OF THE PREFERRED EMBODIMENTS

Figure 1:
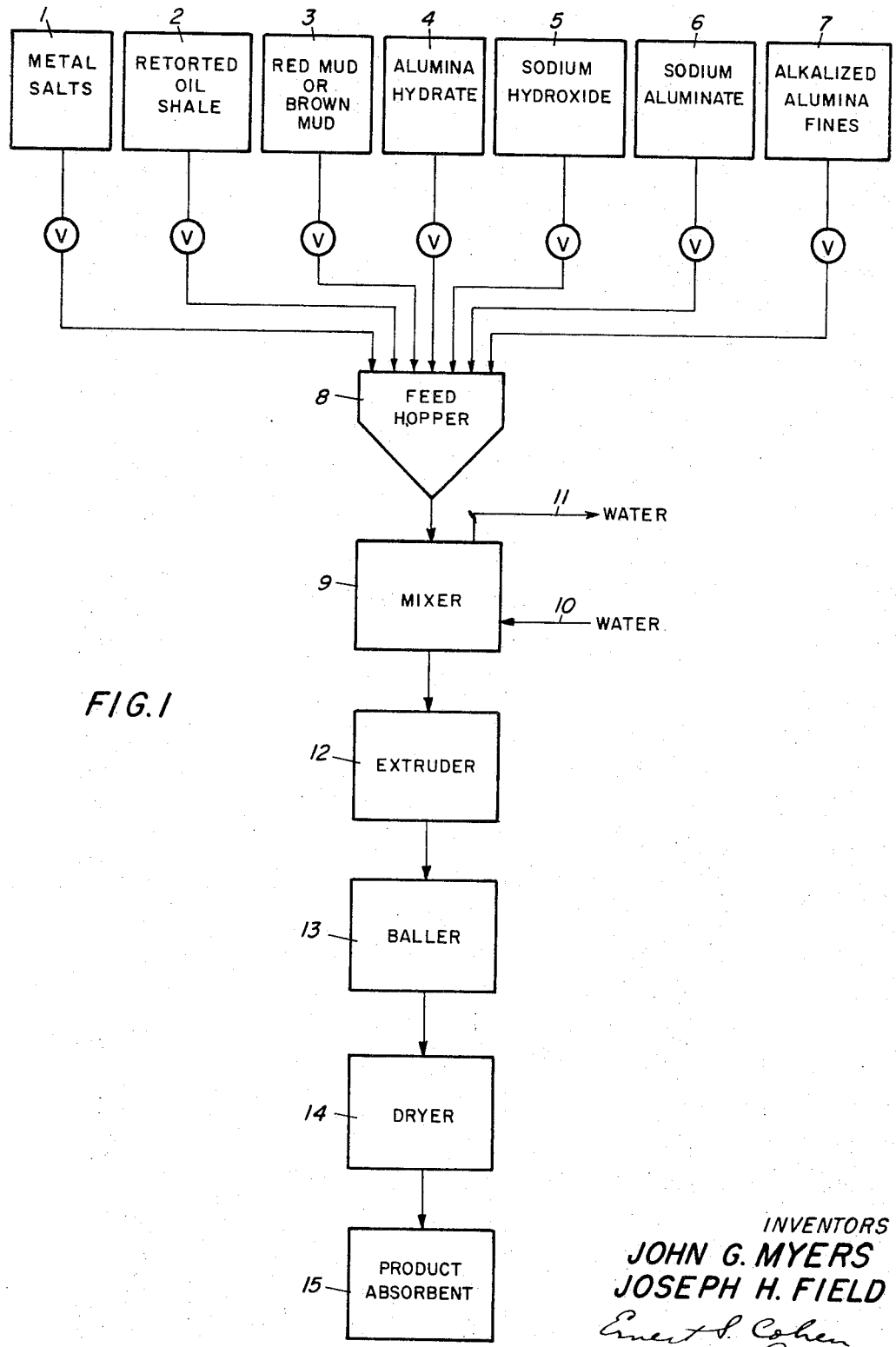
FIG. 1 is a simplified flow diagram illustrating the alternative methods of preparing an improved alkalized alumina absorbent.

In the description of preferred embodiments, the terms listed below will have meaning as assigned:

Absorbent—a substance able to take up specific gases;

Alkalized alumina—a composition containing $Na_2O$ combined with $Al_2O_3$ having some free $Al_2O_3$ and a Na content of from 12 to 30 weight percent;

Alumina—aluminum oxide—$Al_2O_3$;

Alumina hydrate—$Al_2O_3 \cdot xH_2O$;

Bayer process—a process for recovering alumina from bauxite; wherein bauxite is digested with hot concentrated sodium hydroxide, impurities are precipitated and separated, and the dissolved alumina is subsequently separated from solution as alumina hydrate and calcined to form alumina;

Brown mud—the residue resulting from the leaching of a sintered mixture of red mud, limestone and soda ash in the combination process for the manufacture of alumina from high silica content bauxite;

Capacity—(absorbent)—the grams of a specific gaseous component of a gas mixture taken up by an absorbent at 90% removal of said component divided by the grams of absorbent used;

Combination process—a proces for recovering alumina from bauxite wherein said bauxite is digested with caustic, to produce sodium aluminate and red mud and wherein the red mud is further treated by mixing with limestone and soda, sintering and leaching with water to form a brown mud and a sodium aluminate solution. Alumina hydrate is precipitaed from the sodium aluminate solutions and calcined to form alumina and the sodium aluminate solutions are recycled to the digesting stage;

Flue gas (sulfur oxide containing)—process or waste gas resulting from an oxidation or roasting process and containing from 500 p.p.m. to 50,000 p.p.m. of $SO_2$ and/or $SO_3$;

Retorted oil shale—oil shale having substantially all the volatile matter removed;

Reducing gas—H, CO, reformed gas, partially combusted natural gas;

Red mud—the residue resulting when alumina is extracted from bauxite with sodium hydroxide in the Bayer process;

Sodium aluminate—$Na_2Al_2O_4$ or $NaAlO_2$;

Sulfur oxides—inorganic acidic sulfur oxides chiefly sulfur dioxide and sulfur trioxide.

COMPOSITION OF THE ABSORBENTS

The present invention contemplates the preparation of improved alkalized alumina absorbents from combinations of inexpensive and readily obtainable materials. For descriptive purposes, combinations of starting ingredients used to prepare the absorbents can be separated into three main groups.

The first group includes the combination of alumina or alumina hydrate and sodium hydroxide with the addition of red mud or brown mud, retorted oil shale, or the oxides, carbonates, sulfates or nitrates of copper, cobalt and iron. The sodium hydroxide and alumina or alumina hydrate are combined to give a product having a sodium content of from about 12–30 weight percent. Red mud or brown mud may be added in the range of from about 0.2 to 20 weight percent on a dry basis. Retorted oil shale may be added in the range of from about 1 to 50 weight percent, and the metal salts may be added in a range of from about 0.2 to 20 weight percent.

The second group includes the combination of sodium aluminate with red or brown mud, retorted oil shale or the oxides, carbonates, sulfates, or nitrates of copper, cobalt or iron. The sodium content of the product absorbent should be in the range of from 12 to 30 weight percent and the additives listed may be added in the proportions used in the first group of absorbents.

The third group includes absorbents as described in the second group with the further addition of alumina hydrate to produce an absorbent having a sodium content in the range of from 12 to 30 weight percent.

Finally, it should be noted that all of the above-described compositions may also contain up to 50 weight percent of absorbent fines resulting from the use of an absorbent prepared in accordance with this invention in a sulfur oxide absorption. It has been found that whereas the composition of the present absorbents is in many respects similar to prior art alkalized alumina absorbents such as those described in U.S. Pat. 2,992,884 to Bienstock et al. and in Netherlands patent application 298,751, that a substantially improved product is obtained when these compositions are derived from the process of manufacture as described thereinbelow.

METHOD OF PREPARING ABSORBENTS

Referring now to FIG. 1, there is illustrated a method of preparing the absorbents of this invention. In that figure, raw materials 1–7 are fed in the desired proportions to feed hopper 8 and then to mixer 9 along with water 10 if necessary. The amount of water 10 used should be sufficient to render the mixture of raw materials plastic so that it can later be extruded. Generally an amount of water equal to from about 0.2 to about 0.5 gram per gram of total solids will suffice. The order of addition of the raw materials with the water is not critical and the mixing step may be accomplished in a batch or continuous manner. As the mixture is stirred, its temperature will rise and its viscosity will decrease. Normally the temperature will rise to about 90–110° C. and a portion of the water will be released in the form of water vapor 11. Heat can be added to drive off additional water if necessary. Stirring should continue until the mixture is thoroughly reacted and is in a plastic state. The plastic mixture is then passed to an extruder 12 where it is converted into particulate form. As shown in FIG. 1, the extruded mix is then passed to a baller 13 and then to a dryer 14 to form a hard pellet product 15. The hardness of the absorbent can be increased if desired by calcining at temperatures from 375–700° C. The physical form of the absorbent can be tailored by conventional techniques to suit the form of contacting used when the flue gas is treated.

Figure 2:
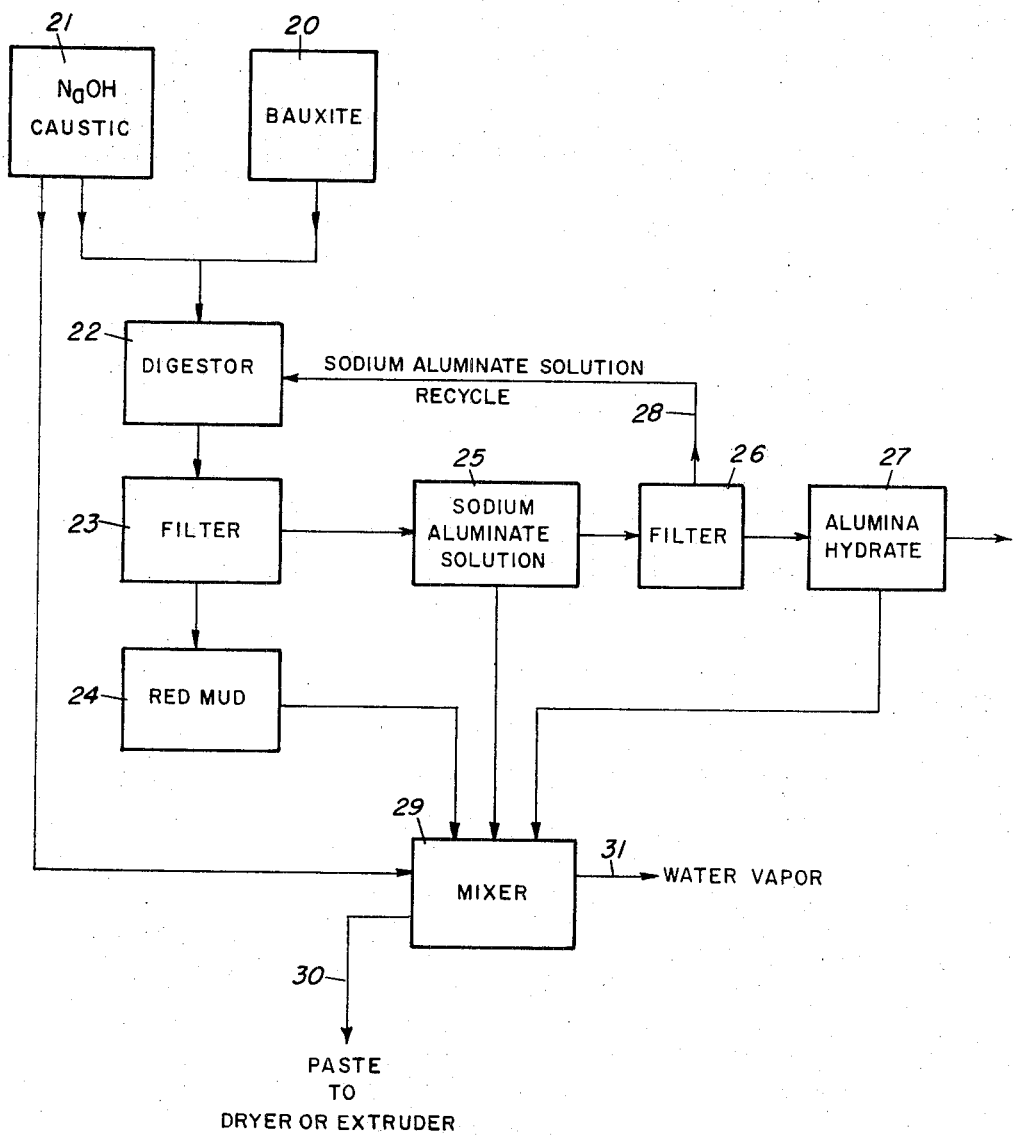
FIG. 2 is a simplified flow diagram illustrating modifications in the conventional "Bayer" process for recovering alumina bauxite which enable the simultaneous production of alumina and an improved alkalized alumina absorbent.
Figure 3:
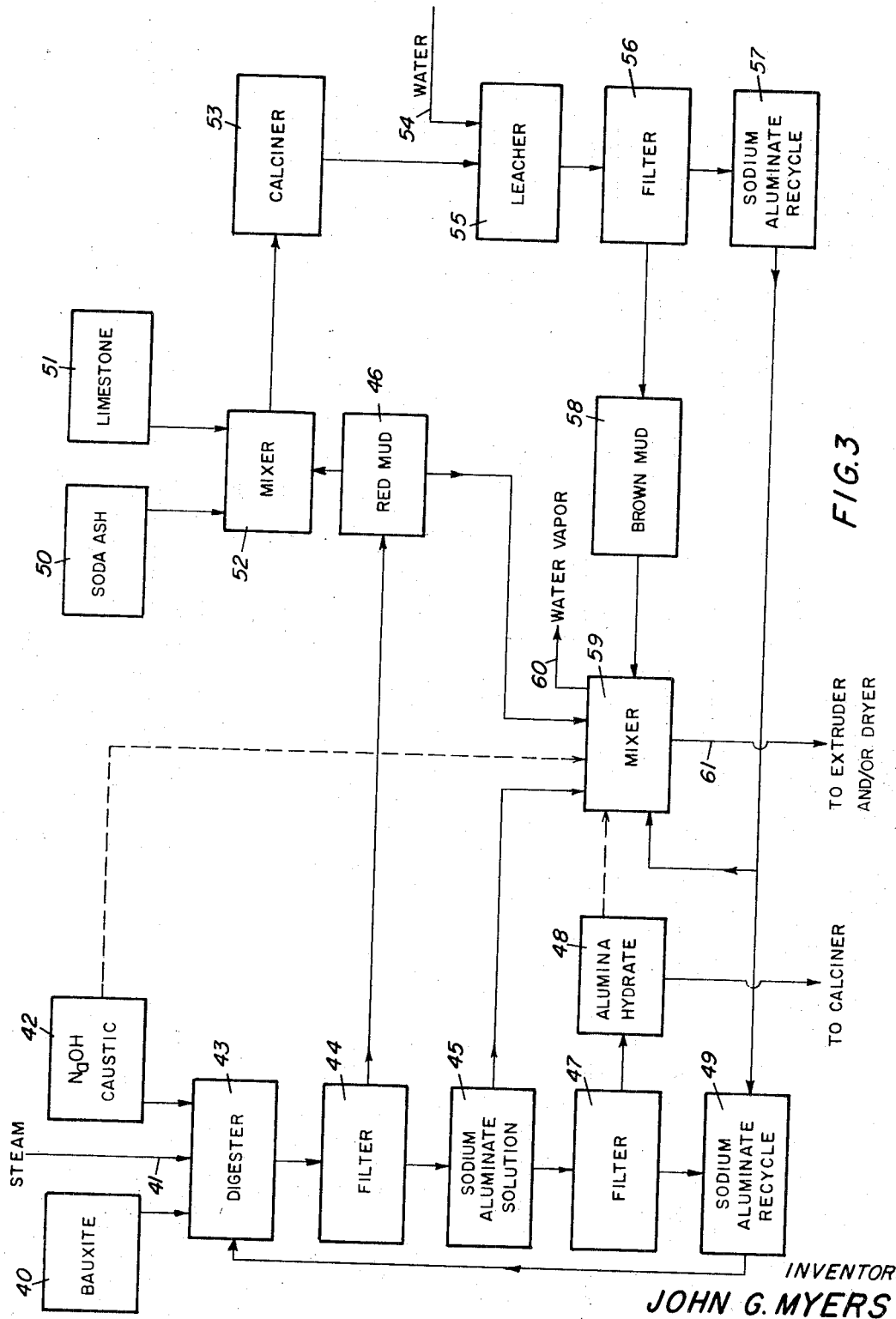
FIG. 3 is a simplified flow diagram illustrating modifications in the conventional "combination" process for recovering alumina from bauxite which enable the simultaneous production of alumina and an improved alkalized alumina absorbent.

FIG. 2 illustrates the preparation of absorbents as by-products of the conventional Bayer process. As shown in that figure, bauxite 20 and caustic soda 21 are mixed together and passed to a digester 22 where the mixture is exposed to elevated temperatures and pressures. Under these conditions the aluminum content of the bauxite is dissolved in the form of sodium aluminate leaving a siliceous residue known as red mud. This mixture of sodium aluminate and red mud leaves digester 22 and is separated by filter 23 into red mud 24 and a sodium aluminate solution 25. Alumina hydrate forms as a solid in sodium aluminate solution 25 and a filter 26 separates the alumina hydrate 27 from the sodium aluminate which is recycled via 28 to digester 22. We have found that the Bayer process can be modified to produce by-product absorbents. This is accomplished by mixing together red mud 24 and sodium aluminate solution 25 in mixer 29 where the heat of mixing or if necessary external heat drives off water vapor 31 such that a paste 30 is formed which can be extruded or dried to produce a product absorbent. The red mud 24 and sodium aluminate 25 should be mixed in the proportions previously disclosed to yield a product paste 30 having a sodium content of from 12–30 weight percent and a red mud content of from 0.2 to 20 weight percent. If necessary, alumina hydrate 27 or sodium hydroxide 21 may be added to mixer 29 along with the red mud and sodium aluminate to achieve the formation of a product having the desired composition. The above description of absorbent production by modification of the Bayer process has been restricted to embodiments which utilize only those materials which are used or produced in the Bayer process. However, as previously described, metal salts, retorted oil shale and spent alkalized alumina absorbent fines may also be incorporated into the production of absorbents as by-products of the Bayer process. The improved alkalized alumina absorbents can also be prepared by modifications of the combination process as shown in FIG. 3. The combination process is conventionally used to recover alumina from bauxite having a high silica content. As shown in FIG. 3, the combination process consists of digesting bauxite 40 with steam 41 and caustic 42 under pressure in digester 43. The resultant slurry is separated in filter 44 into a sodium aluminate solution 45 and red mud 46. As in the Bayer process, alumina hydrate is formed within solution 45 and is separated by filter 47 into alumina hydrate 48 and alumina hydrate free sodium aluminate solution 49. The latter is recycled to digester 43, whereas the alumina hydrate 48 is calcined to form an alumina product. Red mud 46 is ground together with soda ash 50 and limestone 51 in mixer 52, the resulting mix is then heated at temperatures of from about 990–1090° C. in calciner 53 to form a sinter which is contacted with water 54 in a leacher 55 to form a slurry containing dissolved sodium aluminate and a residue called brown mud. This slurry is separated by filter 56 to form a sodium aluminate solution 57 for recycle to digester 43 and brown mud 58 which is normally passed to waste. In our modification of this process, brown mud 58 is combined with sodium aluminate solution 45 or 57 in mixer 59 under conditions in which water vapor 60 is driven off leaving a plastic mass 61 which can be worked into suitable physical form for a product absorbent. Similarly, red mud 46 or a combination of red mud 46 and brown mud 58 may be mixed with the aforementioned sodium aluminate solutions to form product absorbents. As with previous embodiments, the ingredients should be mixed in proportions which yield a product having a sodium content of from about 12 to 30 weight percent and a red mud and/or brown mud content of from 0.2 to 20 weight percent. Caustic 42 or alumina hydrate 48 may be used if necessary to achieve these proportions.

USE OF ABSORBENTS

Figure 4:
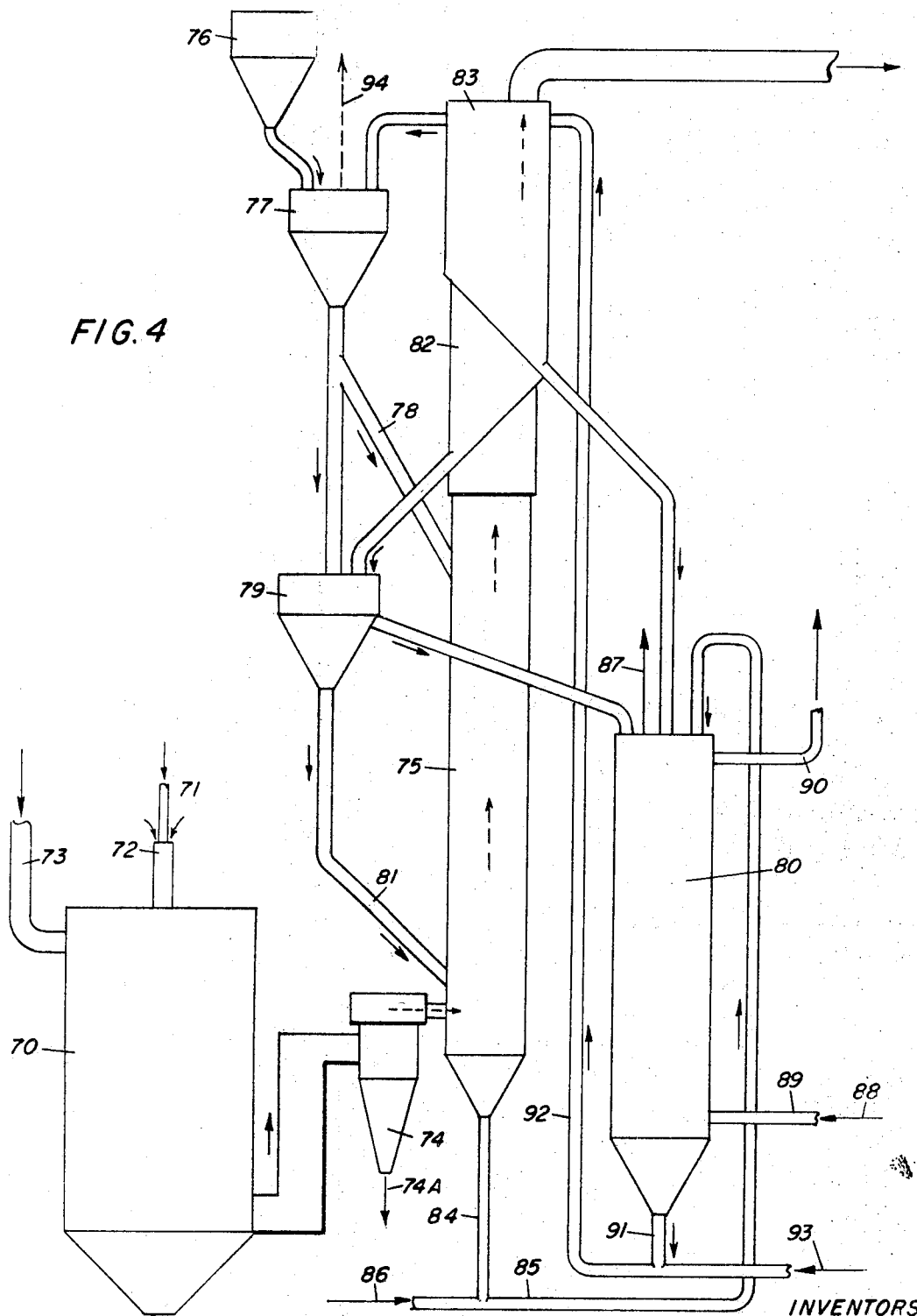
FIG. 4 is a simplified flow diagram illustrating the use of an improved alkalized alumina absorbent in the removal of sulfur oxides from industrial gases.

The absorbents of the present invention are useful for the removal of sulfur oxides from any industrial or waste gas at elevated temperatures. Effluents of this type include flue gases from fuel combustions wherein the fuel contains sulfur impurities, smelter gases, sulfuric acid gases, effluents and waste gases from paper manufacture. A typical application of process for the removal of sulfur oxides from flue gases is shown in FIG. 4. There, the flue gas is formed by the combustion of fuel in a furnace. The furnace represented by 70 is supplied with a coal or oil feed 71, primary air 72 and secondary air 73. The off-gases produced by the combustion of the fuel and which contain undesirable amounts of sulfur oxides are passed through a cyclone 74 to remove particulate matter. As shown in FIG. 4, the gases pass from furnace 70 to cyclone 74 where solids 74A are removed and then directly to absorber 75. In practice, the gases entering the absorber will most likely have past through an economizer and in some cases through an air preheater. The design of the furnace absorber linkage is a matter of choice as the absorbents of the present invention are capable of operation at from about room temperature to about 600° C. As the warm combustion gases pass through absorber 75, the sulfur oxides present are taken up by the absorbent. The resultant sulfur oxide free gases leaving absorber 75 can be vented to the atmosphere or sent to a heat exchanger such as an air preheater, depending upon their temperature and the design considerations of the individual unit. Contact in absorption bed 75 may take any of a number of conventional forms such as a fixed, moving or fluidized bed. For high gas volumes the preferred form of contact is a suspended dilute phase bed with the absorbent present in the form of small particles of spheres. With small gas volumes however, a fixed bed may be more desirable. In the embodiment shown, absorbent enters the system through an absorbent make-up hopper 76 from which it is passed to an absorbent storage hopper 77. A portion of absorbent from hopper 77 is passed via line 78 to absorber unit 75, the remainder of absorbent from hopper 77 passes to absorbent recycle hopper 79. A portion of the absorbent from recycle hopper 79 passes to regeneration unit 80 whereas the major portion passes through line 81 for introduction into absorber 75. Flue gases entering absorber 75 from cyclone 74 carry the majority of absorbent introduced via line 81 upwardly in a cocurrent fashion through unit 75. The absorbent is separated from flue gas by cyclones 82 and 83. Absorbent recovered in cyclone 82 is passed to hopper 79 for recycle while absorbent not entrained in the flue gas is removed via line 84 and is pneumatically passed through line 85 to regenerator 80 with the aid of conveying gas 86. After the mixture of conveying gas and absorbent enters regenerator 80, conveying gas is released from the unit by vent 87.

As shown in FIG. 4, all absorbent feeds enter regenerator 80 at the top and pass in a downward direction and countercurrent to reducing gas 88 which enters unit 80 at 89 and leaves at 90. Regeneration of the absorbent is carried out at temperatures above 600° C. preferably in the range of from 600°–700° C. Regenerated absorbent leaves unit 80 via line 91 and then is pneumatically recycled to hopper 77 through line 92 with the aid of conveying gas 93. The conveying gas is then released from hopper 77 via vent 94.

The following examples illustrate absorbents and their methods of manufacture contemplated by the present invention along with the various features and advantages of the present invention over the prior art.

In all of the following examples, the absorbents were tested with a simulated flue gas having a $SO_2$ content in the range of from 0.28–0.32 percent. The space velocity in each instant was 1050 hr.$^{-1}$.

EXAMPLE 1

362.0 grams of sodium aluminate ($Na_2O \cdot Al_2O_3 \cdot 3H_2O$) was mixed in a blender with 125.0 g. $H_2O$, dried at 150° C. for 10 hours, crushed to 8–16 mesh and pretreated with $H_2$ at 630° C. for 10 hours. This absorbent had a $SO_2$ capacity of 5.1 per 100 grams absorbent at 90% removal of $SO_2$ from the simulated flue gas at 330° C.

This example illustrates the results achieved through the use of sodium aluminate as has been suggested in the prior art.

EXAMPLE 2

362.0 grams of sodium aluminate was mixed in a blender with 36.2 grams of red mud and 150.0 g. of $H_2O$. The resulting mix was dried at room temperature, crushed to 8–16 mesh and pretreated with $H_2$ at 630°–650° C. for 10 hours. This absorbent has a $SO_2$ capacity of 22.5 grams $SO_2$/100 grams absorbent at 90% $SO_2$ removal from the simulated flue gas at 330° C.

EXAMPLE 3

Spent absorbent from Example 2 was regenerated by treatment with $H_2$ at 630°–650° C. for 16 hours. This regenerated absorbent had a loading capacity of 17.6 g. $SO_2$/100 g. absorbent at 90% $SO_2$ removal when contacted with the simulated flue gas at 330° C.

EXAMPLE 4

Spent absorbent from Example 3 was regenerated by treatment with $H_2$ at 630°–650° C. This regenerated absorbent had a loading capacity of 14.6 grams $SO_2$/100 grams absorbent at 90% $SO_2$ removal when contacted with the simulated flue gas at 330° C.

EXAMPLE 5

362.0 grams of sodium aluminate were mixed with 18.1 grams of red mud and 143.0 grams water in a blender, dried for 2 hours at 170° C., crushed to 8–16 mesh and pretreated with $H_2$ at 630°–650° C. for 10 hours. This absorbent had a loading capacity of 20.2 grams $SO_2$/100 grams absorbent at 90% $SO_2$ removal from the simulated flue gas at 330° C.

EXAMPLE 6

Spent absorbent from Example 5 was regenerated by treatment with $H_2$ at 630°–650° C. for 16 hours. This regenerated absorbent had a loading capacity of 17.2 grams $SO_2$/100 grams absorbent at 90% $SO_2$ removal from simulated flue gas at 330° C.

EXAMPLE 7

Spent absorbent from Example 6 was regenerated by treatment with $H_2$ at 630°–650° C. for 16 hours. This regenerated absorbent had a loading capacity of 17.2 grams $SO_2$/100 grams absorbent at 90% $SO_2$ removal from simulated flue gas at 330° C.

EXAMPLE 8

Spent absorbent from Example 7 was regenerated with an $H_2$ treatment at 630°–650° C. for 16 hours. This regenerated absorbent had a loading capacity of 12.3 grams $SO_2$/100 grams absorbent at 90% $SO_2$ removal from the simulated flue gas at 330° C.

EXAMPLE 9

362.0 grams of sodium aluminate were mixed with 72.4 grams of red mud and 164.8 grams $H_2O$ in a blender, and dried for 2 hours at 170° C., and pretreated with $H_2$ at 630°–650° C. for 10 hours. This absorbent had a loading capacity of 20.6 grams $SO_2$/100 grams absorbent at 90% $SO_2$ removal from the simulated flue gas at 330° C.

EXAMPLE 10

Spent absorbent from Example 9 was regenerated by treatment with $H_2$ at 630°–650° C. for 16 hours. This regenerated absorbent had a loading capacity of 14.3 grams $SO_2$/100 grams absorbent at 90% $SO_2$ removal from the simulated flue gas at 330° C.

EXAMPLE 11

362.0 grams of sodium aluminate was mixed with 9.1 of red mud and 139.5 grams $H_2O$ in a blender, dried at 170° C. for 16 hours, and pretreated with $H_2$ at 630°–650° C. for 10 hours. This absorbent had a loading capacity of 16.0 grams $SO_2$/100 grams absorbent at 90% $SO_2$ removal from the simulated flue gas at 330° C.

EXAMPLE 12

Spent absorbent from Example 11 was regenerated by treatment with $H_2$ at 630°–650° C. for 16 hours. This regenerated absorbent had a loading capacity of 18.1 grams $SO_2$/100 grams absorbent at 90% $SO_2$ removal from the simulated flue gas at 330° C.

EXAMPLE 13

Spent absorbent from Example 12 was regenerated by treatment with $H_2$ at 630°–650° C. for 16 hours. This regenerated absorbent had a loading capacity of 17.1 grams $SO_2$/100 grams absorbent at 90% removal of $SO_2$ from the simulated flue gas at 330° C.

EXAMPLE 14

An absorbent was prepared of the same composition of that in Example 11 and in the same manner with the exception that the absorbent was not pretreated with $H_2$. This absorbent had a loading capacity of 23.1 grams $SO_2$/100 grams absorbent at 90% removal of $SO_2$ from the simulated flue gas at 330° C.

EXAMPLE 15

Spent absorbent from Example 14 was regenerated by treatment with $H_2$ at 630°–650° C. for 16 hours. This regenerated absorbent had a loading capacity of 18.8 grams $SO_2$/100 grams absorbent at 90% $SO_2$ removal from the simulated flue gas at 330° C.

EXAMPLE 16

436.0 grams of sodium aluminate was mixed with 14.0 grams ferric sulfate and 151.0 grams of water in a blender, dried at 170° C. for 16 hours and pretreated with $H_2$ at 630°–650° C. for 10 hours. This absorbent had a loading capacity of 13.6 grams $SO_2$/100 grams absorbent at 90% removal of $SO_2$ from the simulated flue gas at 330° C.

EXAMPLE 17

Spent absorbent from Example 16 was regenerated with $H_2$ at 630°–650° C. for 16 hours. This regenerated absorbent had a loading capacity of 18.1 grams $SO_2$/100 grams absorbent at 90% removal of $SO_2$ from the simulated flue gas at 330° C.

EXAMPLE 18

Spent absorbent from Example 17 was regenerated by treatment with $H_2$ at 630°–650° C. for 16 hours. This regenerated absorbent had a loading capacity of 15.4 grams $SO_2$/100 grams absorbent at 90% $SO_2$ removal from the simulated flue gas at 330° C.

EXAMPLE 19

436.0 grams of sodium aluminate were mixed with 8.3 grams of cupric sulfate and 151.0 grams of $H_2O$ in a blender, dried at 170° C. for 16 hours and pretreated with $H_2$ at 630°–650° C. for 10 hours. This absorbent had a loading capacity of 9.0 grams $SO_2$/100 grams absorbent at 90% $SO_2$ removal from the simulated flue gas at 330° C.

EXAMPLE 20

436.0 grams of sodium aluminate were mixed with 15.6 grams of cobaltous sulfate and 151.0 grams of $H_2O$ in a blender, dried at 170° C. for 16 hours, and pretreated with $H_2$ at 630°–650° C. for 10 hours. This absorbent had a loading capacity of 10.6 grams $SO_2$/100 grams absorbent at 90% SO₂ removal from the simulated flue gas at 330° C.

EXAMPLE 21

362.0 grams of sodium aluminate were mixed with 18.1 grams of spent (retorted) mahogany zone oil shale and 143.0 grams of water in a blender, dried at 170° C. for 16 hours, and pretreated with H₂ at 630°–650° C. for 10 hours. This absorbent had a loading capacity of 9.0 grams SO₂/100 grams absorbent at 90% SO₂ removal from the simulated flue gas at 330° C.

EXAMPLE 22

438.0 grams of sodium aluminate were mixed with 166.0 grams of hydrated alumina and 180.0 grams of H₂O in a blender, dried at 150° C. for 10 hours, crushed to 8–16 mesh and pretreated with H₂ at 630°–650° C. for 10 hours. This absorbent had a loading capacity of 8.2 grams SO₂/100 grams absorbent at 90% SO₂ removal from the simulated flue gas at 330° C.

EXAMPLE 23

438 grams of sodium aluminate were mixed with 166.0 grams of hydrated alumina, 30.2 grams of red mud and 239.0 grams of H₂O in a blender, dried at 170° C. for 2 hours and pretreated with H₂ at 630°–650° C. for 10 hours. This absorbent had a loading capacity of 10.4 grams SO₂/100 grams absorbent at 90% SO₂ removal from the simulated flue gas at 330° C.

EXAMPLE 24

Spent absorbent from Example 23 was regenerated by treatment with H₂ at 630°–650° C. for 16 hours. This regenerated absorbent had a loading capacity of 11.3 grams SO₂/100 grams absorbent at 90% SO₂ removal from the simulated flue gas at 330° C.

EXAMPLE 25

Spent absorbent from Example 24 was regenerated by treatment with H₂ at 630°–650° C. for 16 hours. This regenerated absorbent had a loading capacity of 12.5 grams SO₂/100 grams absorbent at 90% SO₂ removal from the simulated flue gas at 330° C.

EXAMPLE 26

Spent absorbent from Example 25 was regenerated by treatment with H₂ at 630°–650° C. for 16 hours. This regenerated absorbent had a loading capacity of 12.7 grams SO₂/100 grams absorbent at 90% SO₂ removal from the simulated flue gas at 330° C.

EXAMPLE 27

146.1 grams of sodium hydroxide were mixed with 322.4 grams of hydrated alumina and 12.0 grams of red mud weer mixed in a blender, dried at 170° C. for 3 hours, and pretreated with H₂ at 630°–650° C. for 10 hours. This absorbent had a loading capacity of 12.8 grams SO₂/100 grams absorbent at 90% SO₂ removal from the simulated flue gas at 330° C.

EXAMPLE 28

Spent absorbent from Example 27 was regenerated by treatment with H₂ at 630°–650° C. for 16 hours. This regenerated absorbent had a loading capacity of 17.0 grams SO₂/100 grams absorbent at 90% SO₂ removal from the simulated flue gas at 330° C.

EXAMPLE 29

Spent absorbent from Example 28 was regenerated by treatment with H₂ at 630°–650° C. for 16 hours. This regenerated absorbent had a loading capacity of 15.1 grams SO₂/100 grams absorbent at 90% SO₂ removal from the simulated flue gas at 330° C.

EXAMPLE 30

48.7 grams of sodium hydroxide were mixed with 110.8 grams of alumina hydrate, 8.0 grams of red mud and 33 grams of H₂O in a blender. After thoroughly mixed, 108 grams of regenerated alkalized alumina absorbent fines were mixed in. The resulting mix was dried 185° C. for 16 hours. There was no pretreatment with H₂. This absorbent had a loading capacity of 8.5 grams SO₂/100 grams absorbent at 90% SO₂ removal from the simulated flue gas at 330° C.

EXAMPLE 31

Spent absorbent from Example 30 was regenerated by treatment with H₂ at 630°–650° C. for 16 hours. This regenerated absorbent had a loading capacity of 11.1 grams SO₂/100 grams absorbent at 90% SO₂ removal from the simulated flue gas at 330° C.

EXAMPLE 32

Spent absorbent from Example 31 was regenerated by treatment with H₂ at 630°–650° C. for 16 hours. This regenerated absorbent had a loading capacity of 9.2 grams SO₂/100 grams of absorbent at 90% SO₂ removal from the simulated flue gas at 330° C.

EXAMPLE 33

Spent absorbent from Example 32 was regenerated by treatment with H₂ at 630°–650° C. for 16 hours. This regenerated absorbent had a loading capacity of 9.8 grams SO₂/100 grams absorbent at 90% SO₂ removal from the simulated flue gas at 330° C.

EXAMPLE 34

332.4 grams of alumina hydrate were mixed with 146.1 grams of sodium hydroxide, 12.0 grams brown mud and 140.0 grams H₂O, dried at 200° C. for 16 hours and crushed to 8–16 mesh. This absorbent had a loading capacity of 7.5 grams SO₂/100 grams absorbent at 90% SO₂ removal from the simulated flue gas at 330° C.

EXAMPLE 35

362.0 grams of sodium aluminate were mixed with 9.1 grams of brown mud and 150.0 grams of H₂O, and dried at 200° C. for 16 hours. There was no pretreatment with hydrogen. This absorbent had a capacity of 11.2 grams SO₂/100 grams absorbent at 90% SO₂ removal from the simulated flue gas at 330° C.

The above examples illustrate the loading capacities of the various absorbents contemplated by this invention. Besides having high loading capacities, the absorbents of this invention have two notable advantages over prior art alkalized alumina absorbents. First, our new absorbents are harder. Consequently, they are more attrition resistant when used in dilute phase beds. For example, the absorbent of Example 27 had a crush strength of 3.13 kilograms prior to activation and 4.14 kilograms whereas the same absorbent prepared by the more conventional sulfate had a crush strength of 2.23 kilograms prior to activation and 0.932 kilograms following activation. Secondly, alkalized alumina absorbents made according to the present invention can be regenerated at lower temperatures.

While this invention has been described in terms of preferred embodiments and specific examples, it will be apparent to those skilled in the art that there are many modifications and adaptations of this invention which are still within the spirit and scope of the invention as claimed hereinbelow.

What is claimed is:

1. A method for making an improved alkalized alumina absorbent having a sodium content of from about 12–30 weight percent for use in the removal of sulfur oxides from flue gases comprising the steps of mixing sodium aluminate with a member selected from the group consisting of:
   (a) an amount of red mud equal to from about 0.2 to about 20 weight percent of dry mixture;
   (b) an amount of retorted oil shale equal to from about 1 to 50 weight percent of dry mixture;
   (c) an amount of metal salts selected from the group consisting of the oxides, carbonates, sulfates and nitrates of copper, cobalt and iron equal to from about 0.2 to 20 weight percent of the dry mixture; and (d) an amount of alumina hydrate equal to from about 5 to about 50 weight percent of dry mixture;

in the presence of an amount of water sufficient to obtain a plastic mass upon mixing, and drying said plastic mixture at a temperature of from about 100° C. to about 200° C.

2. The method of claim 1 wherein said sodium aluminate is formed by reacting from about 50 to about 80 weight percent of a member selected from the group consisting of alumina and alumina hydrate with from about 20 to about 50 weight percent sodium hydroxide.

3. The method of claim 1 wherein said member of said group which is admixed with said sodium aluminate is red mud in the amount of from about 0.2 to about 5.0 weight percent based on a dry mixture.

4. The method of claim 1 wherein said member of said group which is admixed with said sodium aluminate is retorted oil shale in the amount of from about 5 to about 20 weight percent based on a dry mixture.

5. The method of claim 1 wherein said member of said group which is admixed with said sodium aluminate is an amount of metal salts selected from the group consisting of the oxides, carbonates, sulfates and nitrates of copper, cobalt and iron equal to from about 0.2 to about 5.0 weight percent based on a dry mixture.

6. The method of claim 1 wherein said member of said group which is admixed with said sodium aluminate is alumina hydrate and wherein a member selected from the group consisting of:

(a) an amount of red mud equal to from about 0.2 to about 20 weight percent of dry mixture;

(b) an amount of retorted oil shale equal to from about 0.2 to about 20 weight percent of dry mixture, and (c) an amount of metal salts selected from the group consisting of the oxides, carbonates, sulfates and nitrates of copper, cobalt and iron equal to from about 0.2 to 20 weight percent of dry mixture is also admixed with the sodium aluminate.

7. The method of claim 2 wherein said sodium aluminate is formed in situ during said mixing.

8. The method of claim 7 wherein said member of said group admixed with said sodium aluminate is an amount of red mud equal to from about 0.2 to about 5.0 weight percent of the dry mixture.

9. The method of claim 7 wherein said member of said group which is admixed with said sodium aluminate is an amount of retorted oil shale equal to from about 5 to 20 weight percent of the dry mixture.

10. The method of claim 7 wherein said member of said group which is admixed with said sodium aluminate is an amount of metal salts selected from the group consisting of the oxides, carbonates, sulfates and nitrates of copper, cobalt and iron equal to about 0.2 to about 5.0 weight percent of the dry mixture.

11. The method of claim 1 wherein said absorbent also contains an amount up to 50 weight percent of the dry mixture alkalized alumina which has been subjected to at least one sulfur oxide absorption.

12. The method of claim 1 wherein said member of said group which is admixed with sodium aluminate is first mixed with an amount of water equal to from about 0.2 to about 0.5 gram per gram of total solids in said absorbent.

13. The method of claim 1 wherein said plastic mass is extruded into particulate form prior to said drying.

14. The product formed by the method of claim 1.

15. In the process for producing alumina hydrate from bauxite comprising the steps of digesting said bauxite with sodium hydroxide in the presence of sodium aluminate at elevated temperatures and pressures, filtering the products of said digesting to form a sodium aluminate solution containing alumina hydrate and to remove red mud waste, and separating said alumina hydrate from said sodium aluminate solution, the improvement comprising mixing the resulting sodium aluminate solution with an amount of said red mud equal to from about 0.2 to 20 weight percent of the dry mixture.

16. The method of claim 15 wherein the resulting sodium aluminate solution is mixed with an amount of alumina hydrate equal to from about 5 to about 50 weight percent of dry mixture and an amount of said red mud equal to from about 0.2 to about 20 weight percent of dry mixture.

17. In a method for the removal of acidic oxygenated sulfur compounds from gases containing the same wherein said gas is brought into contact with an alkalized alumina absorbent, the improvement comprising using as said alkalized alumina absorbent, the product of claim 14.

18. The method of claim 17 wherein said absorption is accomplished in a temperature range of from about 100° C. to from about 250° C.

19. The method of claim 17 wherein said absorption is accomplished in a temperature range of from about 250° C. to about 600° C.

20. The method of claim 17 wherein after said absorbent becomes spent due to said absorption, said absorbent is regenerated by contact with a reducing gas at a temperature of from about 600° C. to about 750° C.

21. The method of claim 20 wherein regenerated absorbent is recycled to said absorption step.

22. The method of claim 17 wherein said absorbent is in particulate form.

23. The method of claim 21 wherein said absorbent is in particulate form.

References Cited

UNITED STATES PATENTS

| | | | |
|---|---|---|---|
| 1,137,860 | 5/1915 | Howard | 23—143 |
| 2,375,342 | 5/1945 | Brown | 23—143X |
| 2,992,884 | 7/1961 | Bienstock et al. | 23—2.1 |
| 3,322,495 | 5/1967 | Magee | 252—463X |
| 3,411,865 | 11/1968 | Pijpers et al. | 23—2.1 |

PATRICK P. GARVIN, Primary Examiner

U.S. Cl. X.R.

252—438, 440, 443, 455, 463, 466